(12) United States Patent
Ridgway (10) Patent No.: US 7,231,102 B2
(45) Date of Patent: Jun. 12, 2007

(54) ELECTROOPTIC MODULATOR EMPLOYING DC COUPLED ELECTRODES

(75) Inventor: Richard W. Ridgway, Westerville, OH (US)

(73) Assignee: Optimer Photonics, Inc., Columbus, OH (US)

(*) Notice: Subject to any disclaimer, the term of this patent is extended or adjusted under 35 U.S.C. 154(b) by 142 days.

(21) Appl. No.: 11/033,038

(22) Filed: Jan. 11, 2005

(65) Prior Publication Data

US 2005/0226547 A1 Oct. 13, 2005

Related U.S. Application Data

(60) Provisional application No. 60/561,003, filed on Apr. 9, 2004, provisional application No. 60/537,192, filed on Jan. 16, 2004.

(51) Int. Cl.
*G02F 1/295* (2006.01)
(52) U.S. Cl. .................................. 385/9; 385/8
(58) Field of Classification Search .............. 385/9, 385/8
See application file for complete search history.

(56) References Cited

U.S. PATENT DOCUMENTS

| | | | |
|---|---|---|---|
| 5,069,517 A | | 12/1991 | Kersten et al. |
| 5,515,463 A | * | 5/1996 | Hahn .......................... 385/40 |
| 5,751,867 A | * | 5/1998 | Schaffner et al. .............. 385/3 |
| 5,936,752 A | | 8/1999 | Bishop et al. |
| 6,067,186 A | * | 5/2000 | Dalton et al. ................ 359/321 |
| 2003/0026572 A1 | | 2/2003 | Ridgway et al. |
| 2003/0091259 A1 | | 5/2003 | Ooi et al. |
| 2003/0156789 A1 | * | 8/2003 | Bhardwaj et al. .............. 385/37 |

FOREIGN PATENT DOCUMENTS

| | | |
|---|---|---|
| EP | 0 444 688 A2 | 9/1991 |
| WO | WO 03/005120 A1 | 1/2003 |
| WO | WO03005120 A1 * | 1/2003 |

OTHER PUBLICATIONS

Chen et al., "DC biased electro-optic polymer waveguide modulators with low half-wave voltage and high thermal stability", Optical Engineering SPIE USA, vol. 38, No. 12, Dec. 1999, pp. 2000-2008.*
Mongia et al., "RF and Microwave Coupled-Line Circuits", 1999, Artech House, Norwood, pp. 367-372.*

(Continued)

*Primary Examiner*—Frank G. Font
*Assistant Examiner*—Jerry Martin Blevins
(74) *Attorney, Agent, or Firm*—Dinsmore & Shohl LLP (57) ABSTRACT

Optical devices are provided for optical signal modulation under the control of an electrical signal propagating along a traveling wave electrode structure. The electrode structure comprises a coplanar stripline including a control signal electrode interposed between a pair of ground plane electrodes. Each of the ground plane electrodes defines a positively or negatively biased elevated ground plane portion isolated from the control signal input and the control signal output. The present invention also contemplates provision of a coplanar stripline as described and claimed herein.

31 Claims, 6 Drawing Sheets

OTHER PUBLICATIONS

Ortega et al., "Analysis of Quasi-Modes in Periodic Segmented Waveguides", Journal of Lightwave Technology, IEEE, New York, USA, vol. 17, No. 2, Feb. 19999, pp. 369-374.*

Yongqiang Shi et al; Low Halfwave Voltage Electrooptic Polymer Modulators: Design and Fabrication; Part of the SPIE Conference on Second-Order Organic Nonlinear Optics, 11, Denver, Colorado, SPIE vol. 3796, Jul. 1999, pp. 336-344.

M. Hoekman; High-Speed Electro-Optical Modulators; C2V; Mar. 1998; Applicatio Note A1998001.

K.H. Hahn et al: "Novel two-arm microwave transmission line for high-speed electro-optic polymer modulators", Electronics Letters, IEE Stevenage, GB, vol. 30, No. 15, Jul. 21, 1994, pp. 1220-1222.

L.R. Dalton et al: "From Molecules to Opto-chips: Organic Electro-optic Materials", Journal of Materials Chemistry, the Royal Society of Chemistry, Cambridge, GB, vol. 9, 1999, pp. 1905-1920.

A. Chen et al: "DC biased electro-optic polymer waveguide modulators with low half-wave voltage and high thermal stability", Optical Engineering SPIE USA, vol. 38, No. 12, Dec. 1999, pp. 2000-2008.

D. Ortega et al: "Analysis of Quasi-Modes in Periodic Segmented Waveguides", Journal of Lightwave Technology, IEEE, New York, US, vol. 17, No. 2, Feb. 1999, pp. 369-374.

M-C Oh et al: "Recent Advances in Electrooptic Polymer Modulators Incorporating Highly Nonlinear Chromophore", IEEE Journal of Selected Topics in Quantum Electronics, IEEE Service Center, US, vol. 7, No. 5, Sep. 2001, pp. 826-835.

R. Mongia, I. Bahl, P. Bhartia: "RF and Microwave Coupled-Line Circuits", 1999, Artech House, Norwook, pp. 367-372.

* cited by examiner

ELECTROOPTIC MODULATOR EMPLOYING DC COUPLED ELECTRODES

CROSS-REFERENCE TO RELATED APPLICATIONS

This application claims the benefit of U.S. Provisional Application Ser. Nos. 60/537,192 (OPI 0012 MA), filed Jan. 16, 2004, and 60/561,003 (OPI 0016 MA), filed Apr. 9, 2004.

BACKGROUND OF THE INVENTION

The present invention relates to the modulation of optical signals in an electrooptic device and, in some particular embodiments, to an electrode configuration for driving an electrooptic device at high and low frequencies.

BRIEF SUMMARY OF THE INVENTION

According to the present invention, optical devices are provided for optical signal modulation under the control of an electrical signal propagating along a traveling wave electrode structure. The electrode structure comprises a coplanar stripline including a control signal electrode interposed between a pair of ground plane electrodes. Each of the ground plane electrodes defines a positively or negatively biased elevated ground plane portion isolated from the control signal input and the control signal output. The present invention also contemplates provision of a coplanar stripline as described and claimed herein.

In accordance with one embodiment of the present invention, an optical device comprising at least one electrooptic modulator is provided. The optically functional waveguide portion of the electrooptic modulator comprises a modulator input portion, a modulator output portion, and first and second waveguide arms defined between an optical signal splitter in the modulator input portion and an optical signal combiner in the modulator output portion. The electrode portion is configured such that a control signal applied thereto alters a transmission characteristic of light propagating along one or both of the waveguide arms in the optically functional waveguide portion. The electrode portion comprises a coplanar stripline extending from a control signal input, across the optically functional waveguide portion, to a control signal output. The coplanar stripline comprises a control signal electrode and first and second ground plane electrodes. The control signal electrode is positioned between the first and second ground plane electrodes in a substantially common plane with the first and second ground plane electrodes. The first ground plane electrode defines a $-V_{bias}$ elevated ground plane portion isolated from the control signal input and the control signal output. The second ground plane electrode defines a $+V_{bias}$ elevated ground plane portion isolated from the control signal input and the control signal output.

Accordingly, it is an object of the present invention to provide improvements in coplanar striplines and optical devices for optical signal modulation under the control of an electrical signal propagating along a traveling wave electrode structure. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
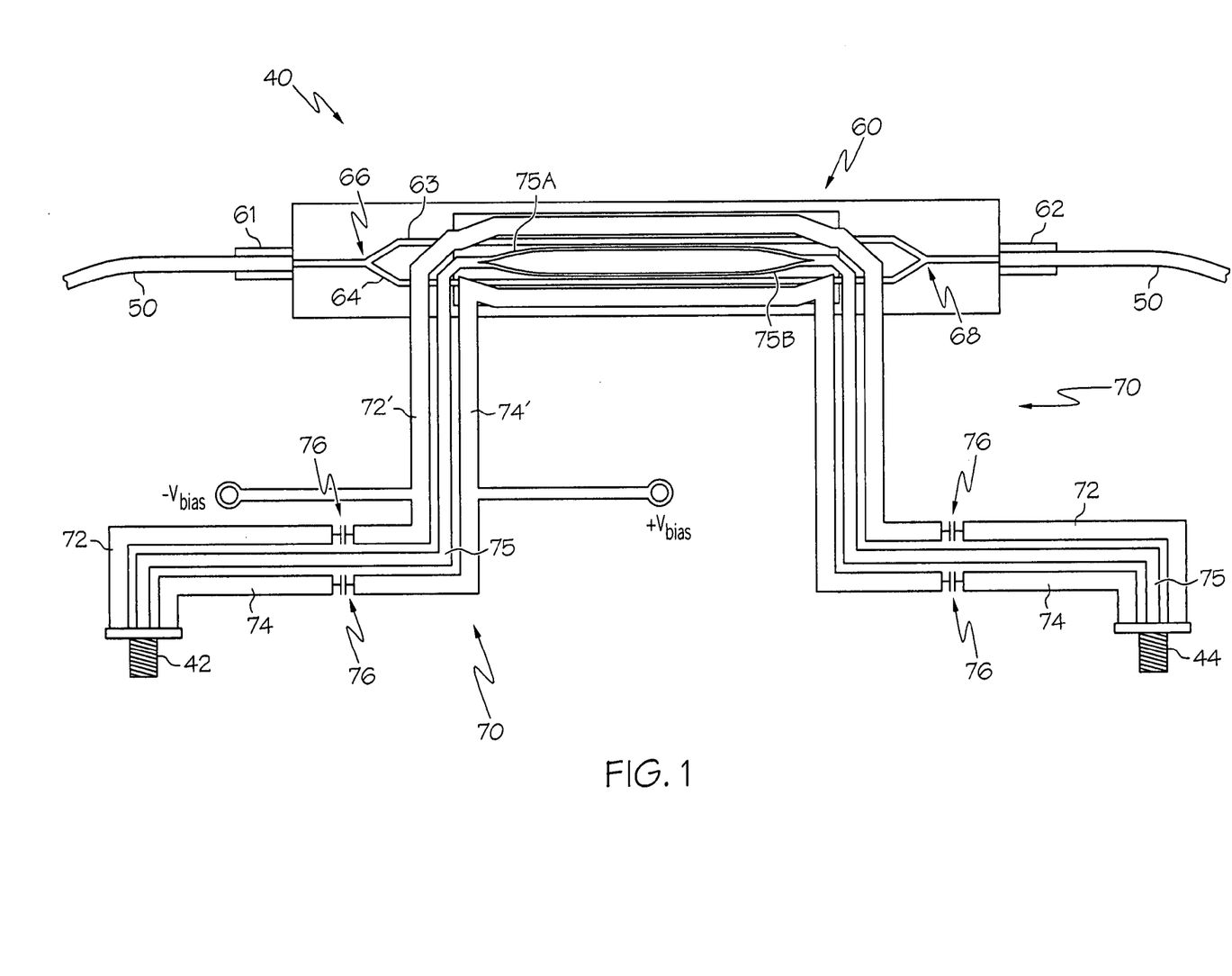
FIG. 1 is a schematic illustration of modulator architecture according to one embodiment of the present invention.

Referring initially to the modulator 40 and the associated electrode structure illustrated in FIG. 1, it is noted that each modulator 40 can be described as comprising an optically functional waveguide portion 60 and an electrode portion 70. The optically functional waveguide portion 60 comprises a modulator input portion 61, a modulator output portion 62, and first and second waveguide arms 63, 64 defined between an optical signal splitter 66 in the input portion 61 and an optical signal combiner 68 in the output portion 62. The electrode portion 70 is configured such that a control signal applied thereto alters a transmission characteristic of light propagating along one or both of the waveguide arms 63, 64. Generally, control signals applied to the control electrodes alter the velocity, phase, polarization, amplitude, or other transmission characteristic of light propagating along the waveguide in the optically functional region of the modulator 40.

Although a variety of modulator configurations may be practiced in accordance with the present invention, it is contemplated that the modulators 40 may comprise a waveguide core and optically functional cladding regions optically coupled to the waveguide core. The respective cladding regions may define a refractive index that is lower than that of the core and may be configured to vary in response to a control signal applied thereto via suitable control electrodes associated with the core/cladding.

It is contemplated that the optically functional cladding regions may include an electrooptic chromophore and may comprise a Pockels effect medium, a Kerr effect medium, or combinations thereof. In a Pockels effect medium, the functional cladding responds to a voltage control signal via the Pockels Effect—an electrooptic effect in which the application of an electric field produces a birefringence that is linear in the applied field. The Pockels Effect can only occur in anisotropic mediums. For a functional polymeric cladding, this anisotropy needed form the Pockels Effect is typically introduced through electric field poling of the cladding. In contrast, un-poled, substantially isotropic, polymer claddings are the most suitable for use in accordance with many embodiments of the present invention because they cannot exhibit the Pockels Effect, so the dominant electrooptic response results from the Kerr Effect—an electrooptic effect in which the application of an electric field produces a birefringence that varies with a square of the magnitude of the applied field or other control signal.

The core material may also comprise a medium where a control signal applied to the electrode pattern alters the velocity, phase, polarization, amplitude, or other transmission characteristics of light propagating along the waveguide core. It is contemplated that many of the embodiments described herein are also applicable for functional electrooptic waveguide cores—with or without functional claddings. It is further contemplated that, in some embodiments of the present invention, it may be preferable to configure the waveguide as a periodically segmented waveguide structure comprising a series of waveguide segments formed of a suitable waveguide core material interspersed between respective segments of an optically functional material along the direction of propagation of the optical signal.

In some particular embodiments of the present invention, it may be preferable to ensure that the optically functional regions of the optically functional waveguide portion 60 comprise a Kerr Effect medium. The Kerr Effect medium can be configured to induce a phase shift $\Delta\phi$ in an optical signal propagating through the optically functional region in response to a suitable control signal. Successive phase shifts $\Delta\phi$ of 180° are induced in the optical signal as a magnitude of the control signal is increased in successive increments. The successive incremental increases in the magnitude of the control voltage decrease in magnitude as the magnitude of the control voltage increases. As a result, relatively small incremental changes in the control voltage can be used to control modulation of the control signal is biased to a sufficiently high value.

As is illustrated in FIG. 1, the electrode portion 70 comprises a coplanar stripline extending from a control signal input 42, across the optically functional waveguide portion 60, to a control signal output 44. The coplanar stripline comprises a control signal electrode 75 and first and second ground plane electrodes 72, 74. The control signal electrode 75 is positioned between, and lies in a substantially common plane with, the first and second ground plane electrodes 72, 74. The first ground plane electrode 72 defines a $-V_{bias}$ elevated ground plane portion 72' isolated from the control signal input 42 and the control signal output 44 by respective DC voltage blocking capacitors 76 connected in series with the control signal input 42 and output 44. Similarly, the second ground plane electrode 74 defines a $+V_{bias}$ elevated ground plane portion 74' isolated from the control signal input 42 and the control signal output 44 by respective DC voltage blocking capacitors 76. In this manner, large DC electric fields may be combined with relatively small RF electric fields on the same traveling wave electrode structure. In addition, the blocking capacitors 76 do not substantially limit transmission of low frequency control signals because they are positioned in the path of the first and second ground plane electrodes, as opposed to the control electrode 75.

The first waveguide arm 63 lies within an electric field region defined between the elevated and negatively biased ground plane portion 72' of the first ground plane electrode and the control signal electrode 75. Similarly, the second waveguide arm 64 lies within an electric field region defined between the elevated and positively biased ground plane portion 74' of the second ground plane electrode 74 and the control signal electrode 75. In this manner, the coplanar stripline defines a push-pull configuration where one electrode reduces the refractive index in one waveguide arm while the second electrode increases the refractive index in the other waveguide arm. The relatively large DC bias creates the large DC electric field necessary for proper operation of some electrooptic materials while the RF control signal establishes the modulation depth of the optically functional waveguide portion 60. By way of illustration, and not limitation, it would not be uncommon to anticipate operating bias voltages greater than about ±100V DC or, more particularly, in the vicinity of about ±750V DC. It is contemplated that the oppositely charged bias voltages may be provided by a single voltage source or multiple voltage sources.

It is noted that, in certain embodiments of the present invention, it may be preferable to limit the use the above-described bias voltages to initial set-up of the modulator structure. More specifically, the relatively high bias voltages described above can be utilized to orient the chromophores of the electrooptic material by applying the bias voltages when the material is at a temperature that is above or near its glass transition temperature. Once the chromophores are oriented properly, the material is cooled to the desired operating temperature of the device and the bias voltages are removed. As long as the desired operating temperature is sufficiently below the glass transition temperature of the electrooptic material, the chromophores will maintain their proper alignment, even with the bias voltages removed. In operation, the RF control signal establishes the modulation depth of the optically functional waveguide portion in the manner described above, with the exception that the bias voltages are not used during operation.

Figure 2A:
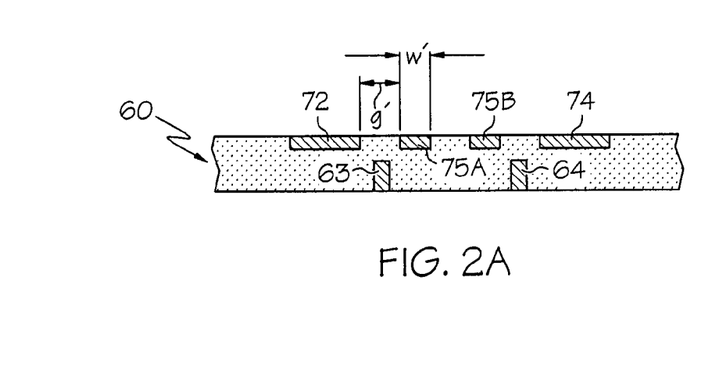
FIGS. 2A and 2B are schematic representations of a portion of the modulator architecture illustrated in FIG. 1, including separate control signal electrode arms.
Figure 2B:
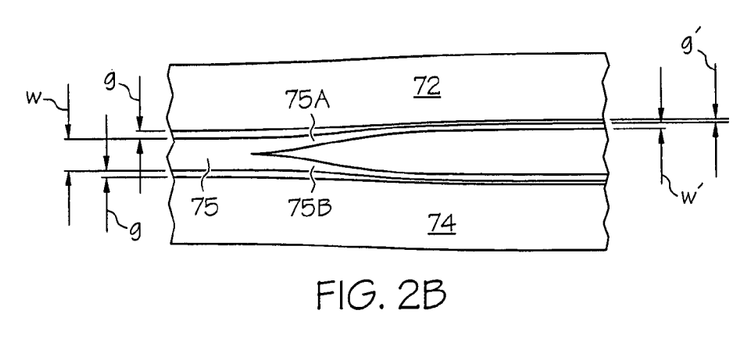

Referring specifically to the configuration of the electrode portion 70 illustrated in FIGS. 1, 2A and 2B, the control signal electrode 75 and first and second ground plane electrodes 72, 74 of the coplanar stripline run substantially parallel to each other within a substantially common electrode plane. Further, the first and second ground plane electrodes 72, 74, or at least substantial portions thereof, are arranged symmetrically about the control signal electrode 75. In the embodiment illustrated in FIG. 1, in those portions of the stripline outside of the optically functional waveguide portion 60 of the electrooptic modulator 40, the first and second ground plane electrodes 72, 74 are arranged symmetrically about substantially the entire control signal electrode 75. Within the optically functional waveguide portion 60, the control signal electrode 75 splits into a first and second control signal electrode arms 75A, 75B and the first and second ground plane electrodes 72, 74 still define a generally symmetric configuration but are arranged asymmetrically about individual ones of the electrode arms 75A, 75B.

The coplanar stripline defined by the first and second ground plane electrodes 72, 74 and the control signal electrode 75 is configured such that the electrode arms 75A, 75B individually define respective impedance values that are about twice as large as the impedance defined by remaining portions of the coplanar stripline. In this manner, a substantially uniform impedance profile is defined as the stripline transitions to and from the first and second control signal electrode arms 75A, 75B within the optically functional waveguide portion 60.

For example, where the intent is to establish a coplanar stripline approximating a 50 ohm impedance, the width w of the control signal electrode 75 outside the optically functional waveguide portion 60 and the gap g separating the control signal electrode from ground are established to define a characteristic impedance of about 50 ohms. Within the optically functional waveguide portion, where the electrode splits into a pair of electrode arms 75A, 75B connected electrically in parallel, the width w' of each electrode arm 75A, 75B and the respective gaps to ground g' are selected to define respective impedances of about 100 ohms within each arm 75A, 75B. As a result the collective impedance represented by the two arms connected in parallel will be about 50 ohms. By way of example, and not limitation, in one embodiment of the present invention, the width w' of each electrode arm 75A, 75B and the respective gaps to ground g' were set at 15 μm to establish respective impedances of about 100 ohms within each arm 75A, 75B.

Generally, the overall configuration of the stripline should allow good microwave transition to and from the elevated ground plane portions 72', 74' of the stripline and to and from the optically functional waveguide portion 60. One way to address this challenge is to ensure that the degree to which the control signal electrode 75 is separated from the first ground plane electrode 72 is substantially equivalent to the degree to which the control signal electrode 75 is separated from the second ground plane electrode 74. More specifically, the gaps $g_1$, $g_2$ separating the ground plane electrodes 72, 74 from the control signal electrode can be made substantially equal along substantially all of the stripline outside of the optically functional waveguide portion 60 or at least along a substantial portion of the stripline. Similarly, the gaps $g_1'$, $g_2'$ separating the control signal electrode arms 75A, 75B and the respective ground plane electrodes 72, 74 within the optically functional waveguide portion 60 can also be made substantially equal.

It is noted that the gaps $g_1'$, $g_2'$ separating the control signal electrode arms 75A, 75B and the respective ground plane electrodes 72, 74 are typically much smaller than the gaps $g_1$, $g_2$ when it is desired to preserve a substantially uniform impedance profile along the stripline. Indeed, the degree to which the gaps $g_1'$ and $g_2'$ are smaller than the gaps $g_1$ and $g_2$ is typically set at a value that is sufficient to preserve a substantially uniform impedance profile of the coplanar stripline as the stripline transitions to and from the optically functional waveguide portion 60. Further, the respective widthwise dimensions w' of the first and second control signal arms can also be made substantially less than a widthwise dimension w of the singular portions of the control signal electrode 75 to help preserve uniform impedance.

Path length discontinuities in the coplanar stripline can also be a significant issue in ensuring good microwave transition along the electrode portion 70. For example, the blocking capacitors 76 can introduce path length discontinuities along the stripline because they are typically only present within the ground plane electrodes 72, 74 and may not be used in the ground plane electrode. Specifically, referring to FIG. 12, where the ground plane electrodes 72, 74 and the control signal electrode 75 are illustrated schematically, it is noted that each blocking capacitor 76 increases the ground plane path length, relative to the corresponding path length a of the control signal electrode 75, by about twice the magnitude of b, where b represents the lateral displacement introduced by each blocking capacitor.

Figure 12:
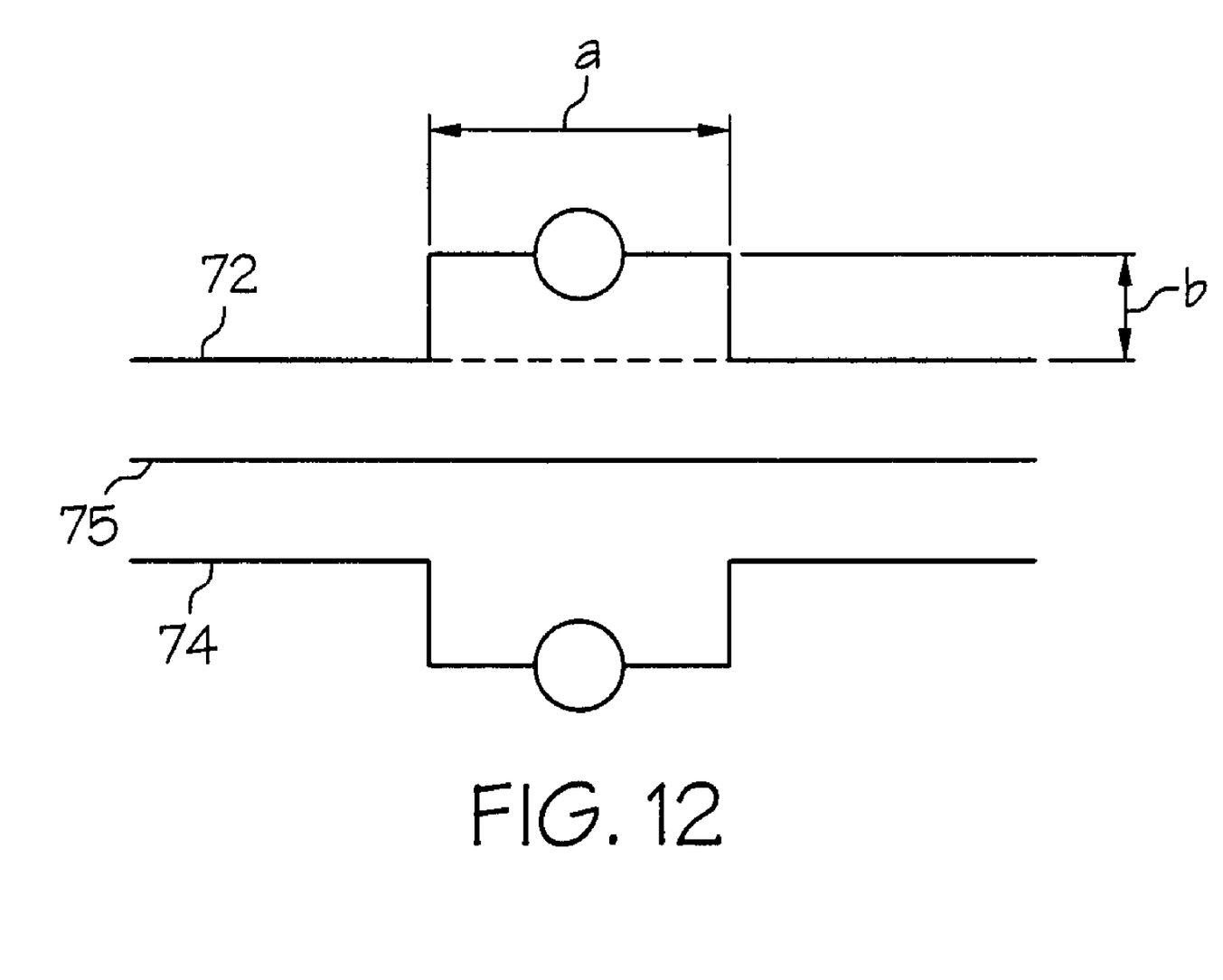
FIG. 12 is a schematic illustration of path length discontinuity in a coplanar stripline according to the present invention.

Taken collectively the four blocking capacitors 76 can contribute a total path length discontinuity equal to 8 times the magnitude of b(4×2b). According to one aspect of the present invention, the blocking capacitors are introduced into the coplanar stripline in such a way as to introduce a path length discontinuity that is less than about ¼λ, where λ is the minimum wavelength of operation of the device. For example, a device operating at a maximum frequency of 1 GHz (λ=300 mm) can be designed so that the path length discontinuity that is less than about 75 mm—dictating that b should be less than about 10 mm. A device operating at a maximum frequency of about 10 GHz (λ=30 mm) can be designed so that the path length discontinuity that is less than about 7.5 mm—dictating that b should be less than 1 mm.

Figure 3A:
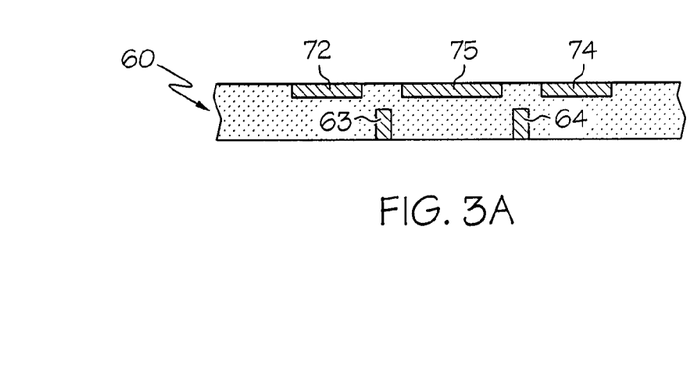
FIGS. 3A and 3B are schematic representations of a selected portion of an alternative modulator architecture according to the present invention, lacking separate control signal electrode arms.
Figure 3B:
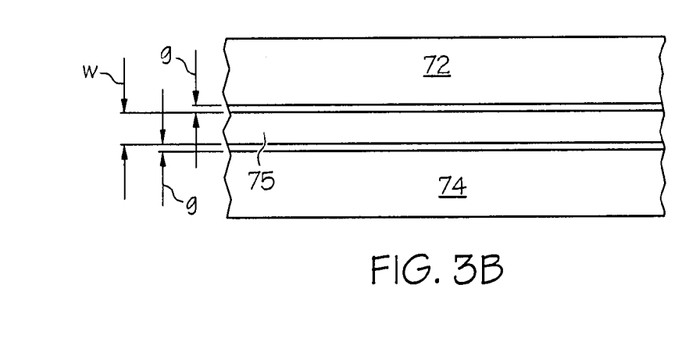
Figure 4:
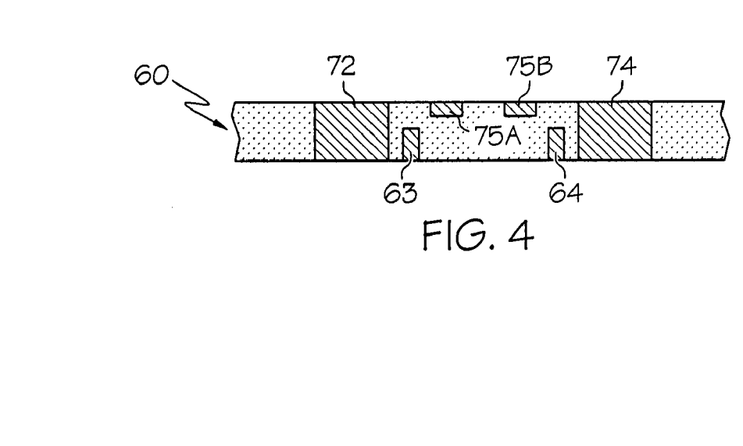
FIGS. 4–7 are schematic illustrations of additional alternative modulator architectures according to the present invention, including separate control signal electrode arms.
Figure 5:
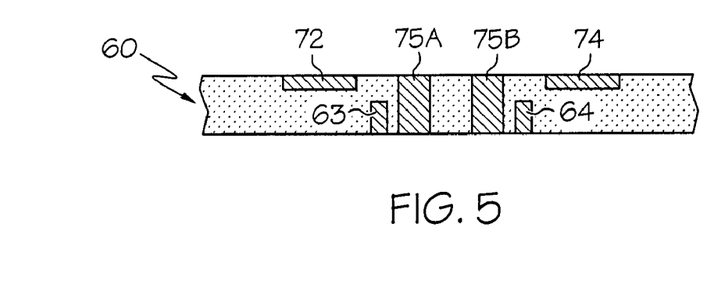
Figure 6:
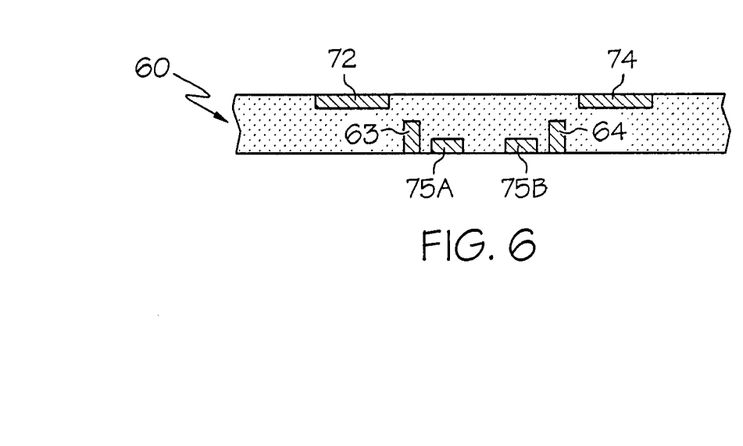
Figure 7:
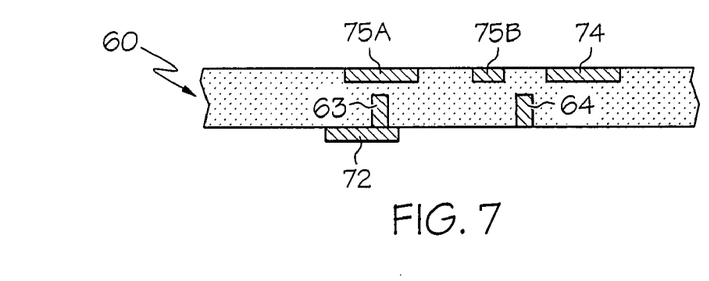
Figure 8:
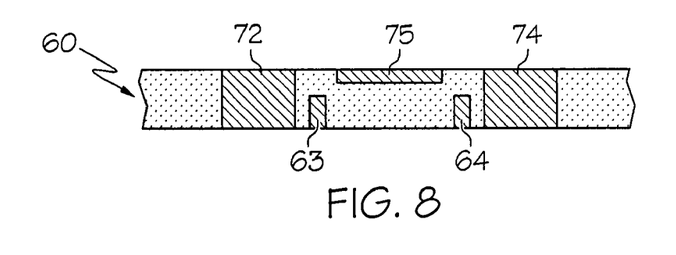
FIGS. 8–11 are schematic illustrations of additional alternative modulator architectures according to the present invention, lacking separate control signal electrode arms.
Figure 9:
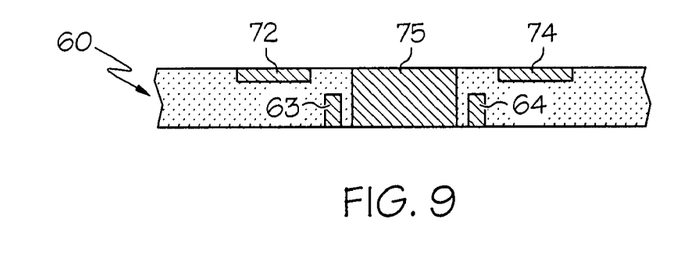
Figure 10:
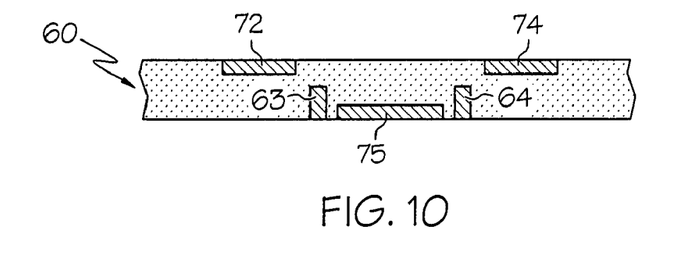
Figure 11:
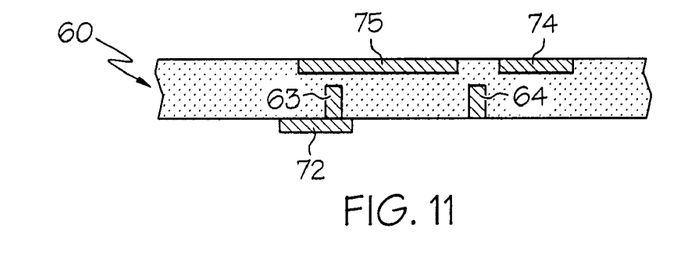

Referring to FIGS. 3A and 3B, it is noted that the coplanar stripline defined by the first and second ground plane electrodes 72, 74 and the control signal electrode 75 can be configured without the individual electrode arms 75A, 75B illustrated in FIGS. 1, 2A, and 2B. Of course, in this embodiment of the present invention, care should be taken to ensure that the impedance value associated with the coplanar stripline within the optically functional waveguide portion is substantially equal to the impedance value associated with the coplanar stripline within the electrode portion 70. Generally, the impedance value of the stripline will depend upon three primary factors: (i) the dielectric constant of the material separating the electrodes 72, 74, 75; (ii) the separation or gap between the control signal electrode 75 and the associated ground plane electrode; and (iii) the width of the control signal electrode 75. Accordingly, those practicing the present invention should direct attention to these primary factors in configuring the stripline to preserve uniform impedance characteristics along the length of the stripline.

FIGS. 4–7 illustrate additional configurations for the waveguide portion 60. In FIGS. 4–7, the control signal electrode arms 75A, 75B, the ground plane electrodes 72, 74, and the waveguide arms 63, 64 are configured to provide for modulation of both the TE and TM polarizations of the optical signal. In this manner, electrooptic modulators 40 according to the present invention can be configured to polarization independent.

The additional configurations illustrated in FIGS. 8–11 are similar to those of FIGS. 4–7 in that they also provide for polarization independent operation. However, in the embodiments of FIGS. 8–11, a single control signal electrode 75 similar to that illustrated in FIGS. 3A and 3B is provided in place of the individual control signal electrode arms 75A, 75B of FIGS. 4–7.

Figure 13:
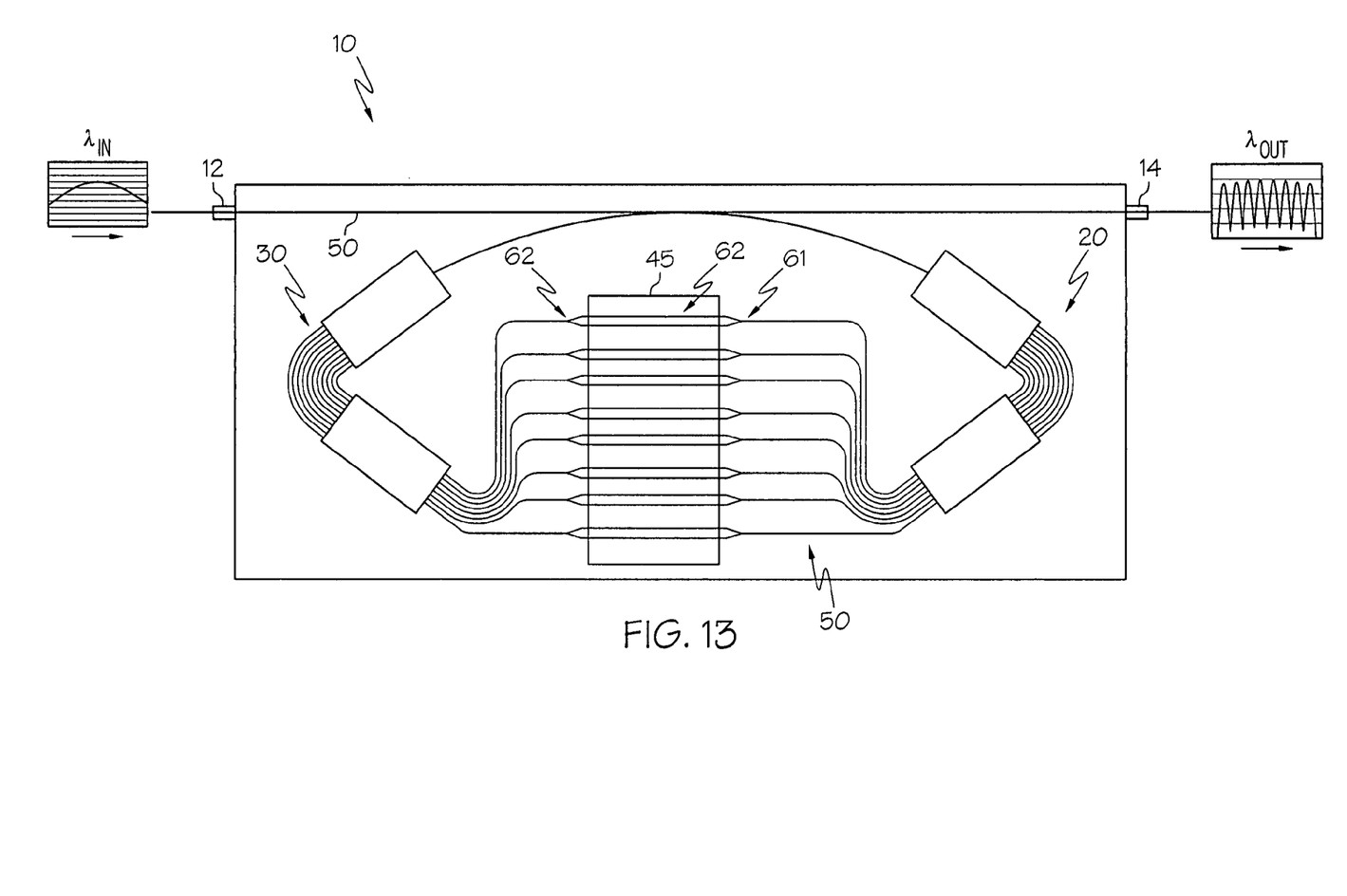
FIG. 13 is a schematic illustration of an electrooptic modulator according to one embodiment of the present invention.

Referring to FIG. 13, the concepts of the present invention can also be illustrated in the context of an electrooptic mod/mux device 10 configured to modulate selected portions of a broad-band signal $\lambda_{IN}$ and re-multiplex the modulated signals onto a single optical fiber as an output signal $\lambda_{OUT}$. Generally, the optical device 10 comprises a broadband optical signal input 12, a modulated and multiplexed optical signal output 14, first and second arrayed waveguide gratings 20, 30, a plurality of electrooptic modulators 40 (see FIG. 1) arranged in a modulator array 45, and a variety of waveguides 50 interconnecting the various components of the device 10 in the manner illustrated in FIG. 13.

The broadband optical signal $\lambda_{IN}$ propagating along a fiber optic line 15 enters the device at the optical signal input 12 and is directed to the first arrayed waveguide grating 20 via a suitable waveguide 50. The first arrayed waveguide grating 20 demultiplexes the broadband optical signal $\lambda_{IN}$ by dividing the broadband signal into component signals of relatively discrete wavelengths. For example, where the broadband light source comprises a superluminescent light emitting diode characterized by a 3 dB spectral width of about 40 nm, centered at about 1490 nm, the signal can be demultiplexed to eight component signals characterized by a channel spacing of about 5 nm and a 3 dB channel width of about 2 nm (e.g., 1470 nm, 1475 nm, 1480 nm, 1485 nm, 1490 nm, 1495 nm, 1500 nm, 1505 nm). Individual components of the broadband signal divided in this manner are then directed along separate waveguides 50 to individual modulators 40 of the modulator array 45.

For the purposes of defining and describing the present invention, it is noted that a broadband light source is characterized by a spectral width that is sufficient to permit wavelength division of the optical signal into a plurality of distinct and separately usable component signals characterized by different optical wavelengths. A broadband light source may also comprise a collection of individual component light sources defining separately usable component signals characterized by different optical wavelengths. In either case, distinct wavelength portions of the optical signal may be carried along respective branches of the waveguide network and may be subject to independent modulation, as is described below with reference to the electrooptic modulators 40 of the array 45. Although a variety of suitable spectral widths are contemplated, in many embodiments of the present invention, it may be preferable to ensure that the broadband light source is characterized by a spectral width sufficient to enable the first arrayed waveguide grating 20 to demultiplex the optical signal $\lambda_{IN}$ into a plurality of signals separated from each other by at least about 2 nm. It is noted that a variety of light emitting diodes, e.g., super luminescent light emitting diodes, would be suitable for use as the broadband light source of the present invention, although a variety of other suitable broadband light sources exist and are likely to be developed. I It is contemplated that specific embodiments of the present invention may be best served by ensuring that the first arrayed waveguide grating 20 is configured to generate a demultiplexed channel spacing and width characterized by a channel spacing/width ratio of at least about 2:1 for a channel width at about 3 dB. It is further contemplated that, in some embodiments of the present invention, it may be desirable to ensure that the first arrayed waveguide grating 20 is characterized by a demultiplexer periodicity of less than about 3 nm.

The electrooptic modulator array 45 is configured to permit selective modulation of the demultiplexed components of the optical signal propagating from the first arrayed waveguide grating 20 along the individual waveguides 40 illustrated in FIG. 13. As is illustrated schematically in FIG. 13, the modulator array 45 comprises an array of Mach Zehnder couplers and electrooptic modulators configured for wavelength selective splitting and modulation. To this end, a suitable array of control electrodes can be provided in the manner illustrated in FIG. 1, although it is contemplated that a variety of suitable control electrode configurations may be utilized in practicing the present invention.

The second arrayed waveguide grating 30 is configured to multiplex the demultiplexed and selectively modulated optical signal propagating along individual waveguides 50 from the modulator array in the direction of the grating 30. The multiplexed optical signals are subsequently be directed to the optical output 14. As is illustrated in FIG. 1, the first and second arrayed waveguide gratings 20, 30, the modulator array 45, and the optical waveguides 50 can be defined on a common substrate of, e.g., silica, silicon, or other like materials, so as to define a planar lightwave circuit (PLC). A variety of suitable waveguide materials are contemplated by the present invention including, but not limited to, silica, silicon, etc. The first and second arrayed waveguide gratings typically define functionally equivalent structures.

A variety of configurations may also be utilized to form the arrayed waveguide gratings and the functional regions of the modulator array 45. For example, and not by way of limitation, the functional regions may comprise: electrooptically clad silica waveguides; silicon waveguides with electroabsorptive modulators where charge injected into the silicon waveguide makes the waveguide opaque; sol-gel waveguides with electrooptic claddings; lithium niobate waveguides, where the refractive index of the waveguide is dependent upon an applied electric field; and electrooptic polymer waveguides. It is contemplated that electrooptic polymers and other suitable waveguide materials may be utilized throughout the optical architecture of the present invention.

Although many embodiments of the present invention are illustrated herein with reference to optical signal splitters and combiners in the form of directional coupling regions, it is noted that the present invention contemplates utilization of any suitable conventional or yet to be developed structure for optical signal splitting or combining. For example, suitable alternative structures for splitting and combining optical signals include, but are not limited to, 2×2 directional coupling regions, 1×2 directional coupling regions, 1×2 Y signal splitters and combiners, and 1×2 and 2×2 multimode interference element splitters and combiners. The specific design parameters of these structures are beyond the scope of the present invention and may be gleaned from existing or yet to be developed sources, including U.S. Pat. Pub. No. 2004/0008916 A1, the disclosure of which is incorporated herein by reference.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical wave guide. An optical waveguide may comprise any suitable signal propagating structure. Examples of optical waveguides include, but are not limited to, optical fibers, slab waveguides, and thin-films used, for example, in integrated optical circuits.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An optical device comprising at least one electrooptic modulator, said electrooptic modulator comprising an optically functional waveguide portion and an electrode portion, wherein:
    said optically functional waveguide portion comprises a modulator input portion, a modulator output portion, and first and second waveguide arms defined between an optical signal splitter in said modulator input portion and an optical signal combiner in said modulator output portion;
    said electrode portion is configured such that a control signal applied thereto alters a transmission characteristic of light propagating along one or both of said waveguide arms in said optically functional waveguide portion;
    said electrode portion comprises a coplanar stripline extending from a control signal input, across said optically functional waveguide portion, to a control signal output; and
    said coplanar stripline comprises a control signal electrode and first and second ground plane electrodes and defines a substantially uniform impedance profile from a control signal input, across said optically functional waveguide portion, to a control signal output.

2. An optical device as claimed in claim 1 wherein:
    said first ground plane electrode defines a $-V_{bias}$ elevated ground plane portion isolated from said control signal input and said control signal output; and
    said second ground plane electrode defines a $+V_{bias}$ elevated ground plane portion isolated from said control signal input and said control signal output.

3. An optical device as claimed in claim 1 wherein:
    chromphores within an optically functional waveguide portion of said first waveguide arm define a $-V_{bias}$ static orientation in a first electric field region between said first ground plane electrode and said control signal electrode; and
    chromphores within an optically functional waveguide portion of said second waveguide arm define a $+V_{bias}$ static orientation in a first electric field region between said second ground plane electrode and said control signal electrode.

4. An optical device as claimed in claim 1 wherein said control signal electrode is positioned between said first and second ground plane electrodes in a substantially common plane with said first and second ground plane electrodes.

5. An optical device as claimed in claim 1 wherein said first and second ground plane electrodes are arranged symmetrically about substantially all of said control signal electrode in said substantially common plane outside of said optically functional waveguide portion of said electrooptic modulator.

6. An optical device as claimed in claim 1 wherein:
    said control signal electrode is separated from said first ground plane electrode by a gap $g_1$ along substantially all of its length outside of said optically functional waveguide portion of said modulator;
    said control signal electrode is separated from said second ground plane electrode by a gap $g_2$ along substantially all of its length outside of said optically functional waveguide portion of said modulator; and
    said gap $g_1$ and said gap $g_2$ are substantially equal.

7. An optical device as claimed in claim 6 wherein:
    said control signal electrode is separated from said first ground plane electrode by a gap $g_1'$ along substantially all of its length within said optically functional waveguide portion of said modulator; and
    said control signal electrode is separated from said second ground plane electrode by a gap $g_2'$ along substantially all of its length within said optically functional waveguide portion of said modulator;
    said gap $g_1'$ and said gap $g_2'$ are substantially equal; and
    said gaps $g_1'$ and $g_2'$ are substantially smaller than said gaps $g_1$ and $g_2$.

8. An optical device as claimed in claim 7 wherein a degree to which said gaps $g_1'$ and $g_2'$ are smaller than said gaps $g_1$ and $g_2$ is sufficient to preserve a substantially uniform impedance profile of said coplanar stripline as said stripline transitions to and from said optically functional waveguide portion.

9. An optical device as claimed in claim 1 wherein:
    said control signal electrode comprises first and second control signal electrode arms within said optically functional waveguide portion; and
    said first and second ground plane electrodes are arranged asymmetrically about individual ones of said first and second control signal electrode arms.

10. An optical device as claimed in claim 1 wherein:
    said control signal electrode comprises first and second control signal electrode arms within said optically functional waveguide portion; and
    said coplanar stripline is configured such that said first and second control signal electrode arms individually define respective impedance values that are about twice as large as the impedance defined by remaining portions of said coplanar stripline.

11. An optical device as claimed in claim 1 wherein said elevated ground plane portions of said first and second ground plane electrodes are isolated from said control signal input and output by respective DC voltage blocking capacitors connected in series with said control signal input and output.

12. An optical device as claimed in claim 11 wherein said blocking capacitors are configured within said coplanar stripline in such a way as to introduce a path length discontinuity in said stripline, said discontinuity being less than about ¼λ, where λ is the wavelength corresponding to the maximum operating frequency of said device.

13. An optical device as claimed in claim 11 wherein said blocking capacitors are configured within said coplanar stripline in such a way as to introduce a path length discontinuity in said stripline, said discontinuity being less than about 75 mm.

14. An optical device as claimed in claim 11 wherein said blocking capacitors are configured within said coplanar stripline in such a way as to introduce a path length discontinuity in said stripline, said discontinuity being less than about 7.5 mm.

15. An optical device as claimed in claim 1 wherein said first ground plane electrode is connected to a negative DC voltage source and said second ground plane electrode is connected to a positive DC voltage source.

16. An optical device as claimed in claim 15 wherein said device comprises a single voltage supply configured to provide said negative and positive DC voltage sources.

17. An optical device as claimed in claim 1 wherein:
said $-V_{bias}$ elevated ground plane is characterized by an electric potential of at least about −100V DC; and
said $+V_{bias}$ elevated ground plane is characterized by an electric potential of at least about +100V DC.

18. An optical device as claimed in claim 1 wherein:
said $-V_{bias}$ elevated ground plane is characterized by an electric potential of at least about −750V DC; and
said $+V_{bias}$ elevated ground plane is characterized by an electric potential of at least about +750V DC.

19. An optical device as claimed in claim 1 wherein said optically functional waveguide portion comprises a Kerr Effect medium characterized by a dominant electrooptic response where the application of an electric field produces a birefringence in a propagating optical signal that varies with a square of the magnitude of a control signal in said control signal electrode, biased by the DC voltage in said elevated ground planes.

20. An optical device as claimed in claim 1 wherein said optically functional waveguide portion is configured to be polarization independent.

21. An optical device as claimed in claim 1 wherein said coplanar stripline and said optically functional waveguide portion are configured to permit modulation of an optical signal in excess of about 1 GHz.

22. An optical device as claimed in claim 1 wherein said optical device further comprises a plurality of said electrooptic modulators arranged in a modulator array.

23. An optical device as claimed in claim 22 wherein said optical device further comprises:
an optical input;
an optical output;
a first arrayed waveguide grating configured to demultiplex an optical signal propagating in a downstream direction from said optical input and direct said demultiplexed signal to said modulator array;
a second arrayed waveguide grating configured to multiplex a signal modulated and output from the modulator array and direct said multiplexed signal to said optical output.

24. An optical device as claimed in claim 23 wherein said optical device further comprises a passive optical network of optical waveguides in communication with said first and second arrayed waveguide gratings.

25. An optical device as claimed in claim 23 wherein said first and second arrayed waveguide gratings and said modulator array are configured as a silica-based planar lightwave circuit.

26. An optical device as claimed in claim 23 wherein said first arrayed waveguide grating is configured to generate a demultiplexed channel spacing and width characterized by a channel spacing/width ratio of at least about 2:1 for a channel width at about 3 dB.

27. An optical device as claimed in claim 1 wherein said optically functional waveguide portion is configured as a periodically segmented waveguide structure.

28. An optical device as claimed in claim 1 wherein said optically functional waveguide portion comprises an electrooptic material comprising chromophores aligned along a poling contour defined by bias voltages generated by said control signal electrode and said first and second ground plane electrodes.

29. An optical device comprising at least one electrooptic modulator, said electrooptic modulator comprising an optically functional waveguide portion and an electrode portion, wherein:
said optically functional waveguide portion comprises a modulator input portion, a modulator output portion, and first and second waveguide arms defined between an optical signal splitter in said modulator input portion and an optical signal combiner in said modulator output portion;
said electrode portion is configured such that a control signal applied thereto alters a transmission characteristic of light propagating along one or both of said waveguide arms in said optically functional waveguide portion;
said electrode portion comprises a stripline extending from a control signal input, across said optically functional waveguide portion, to a control signal output;
said stripline comprises a control signal electrode and first and second ground plane electrodes and defines a substantially uniform impedance profile from a control signal input, across said optically functional waveguide portion, to a control signal output;
said first ground plane electrode defines a $-V_{bias}$ elevated ground plane portion isolated from said control signal input and said control signal output; and
said second ground plane electrode defines a $+V_{bias}$ elevated ground plane portion isolated from said control signal input and said control signal output.

30. An optical device as claimed in claim 29 wherein said stripline comprises a coplanar stripline.

31. An optical device as claimed in claim 29 wherein said coplanar stripline defines a substantially uniform impedance profile from a control signal input, across said optically functional waveguide portion, to a control signal output.

* * * * *